US012650637B2

(12) United States Patent
Heise et al.

(10) Patent No.: US 12,650,637 B2
(45) Date of Patent: Jun. 9, 2026

(54) METHOD FOR OPERATING A DISCHARGE LAMP AND DISCHARGE LAMP

(71) Applicant: OSRAM GmbH, Munich (DE)

(72) Inventors: Michael Heise, Berlin (DE); Bernd Koch, Niedergörsdorf (DE); Sascha Piltz, Berlin (DE); Kai Wolter, Berlin (DE)

(73) Assignee: OSRAM GmbH, Munich (DE)

( * ) Notice: Subject to any disclaimer, the term of this patent is extended or adjusted under 35 U.S.C. 154(b) by 688 days.

(21) Appl. No.: 17/898,709

(22) Filed: Aug. 30, 2022

(65) Prior Publication Data

US 2023/0071761 A1 Mar. 9, 2023

(30) Foreign Application Priority Data

Aug. 31, 2021 (DE) ..................... 10 2021 209 574.7

(51) Int. Cl.
*G03B 21/20* (2006.01)
*H05B 41/292* (2006.01)
*H05B 41/39* (2006.01)

(52) U.S. Cl.
CPC ..... *G03B 21/2026* (2013.01); *G03B 21/2053* (2013.01); *H05B 41/2928* (2013.01); *H05B 41/39* (2013.01)

(58) Field of Classification Search
CPC .... H05B 41/2928; H05B 45/46; H05B 45/00; H05B 47/175; H05B 41/2806; H05B 41/2887; H05B 45/12; H05B 45/20; H05B 45/30; H05B 45/58; H05B 47/198
See application file for complete search history.

(56) References Cited

U.S. PATENT DOCUMENTS

| | | | | |
|---|---|---|---|---|
| 5,936,358 | A * | 8/1999 | Okamoto | H01J 65/046 315/307 |
| 7,023,144 | B2 | 4/2006 | Suzuki et al. | |
| 2004/0178733 | A1 * | 9/2004 | Tukamoto | H01J 61/86 315/56 |
| 2006/0055344 | A1 * | 3/2006 | Muramatsu | H05B 41/2923 315/291 |
| 2009/0051300 | A1 * | 2/2009 | Deppe | H05B 41/2926 315/307 |
| 2010/0171434 | A1 * | 7/2010 | Breuer | H05B 41/2928 315/224 |

(Continued)

FOREIGN PATENT DOCUMENTS

| | | |
|---|---|---|
| DE | 10 2008 003 831 A1 | 8/2008 |
| DE | 10 2014 220 780 A1 | 4/2016 |

*Primary Examiner* — Wei (Victor) Y Chan
(74) *Attorney, Agent, or Firm* — Hauptman Ham, LLP

(57) ABSTRACT

A method for operating a discharge lamp by modulating a current signal is presented. The discharge lamp is operated with at least two different frequencies. At first a probability distribution function for a first number of first frequency periods and a second number of second frequency periods is defined. Next, the first number of first frequency periods and the second number of second frequency periods are determined depending on the probability distribution function by at least one random number. The current signal is modulated by applying the first number of first frequency periods and the second number of second frequency periods to the current signal for operating the discharge lamp.

17 Claims, 6 Drawing Sheets

(56)  References Cited

U.S. PATENT DOCUMENTS

Figure 1:
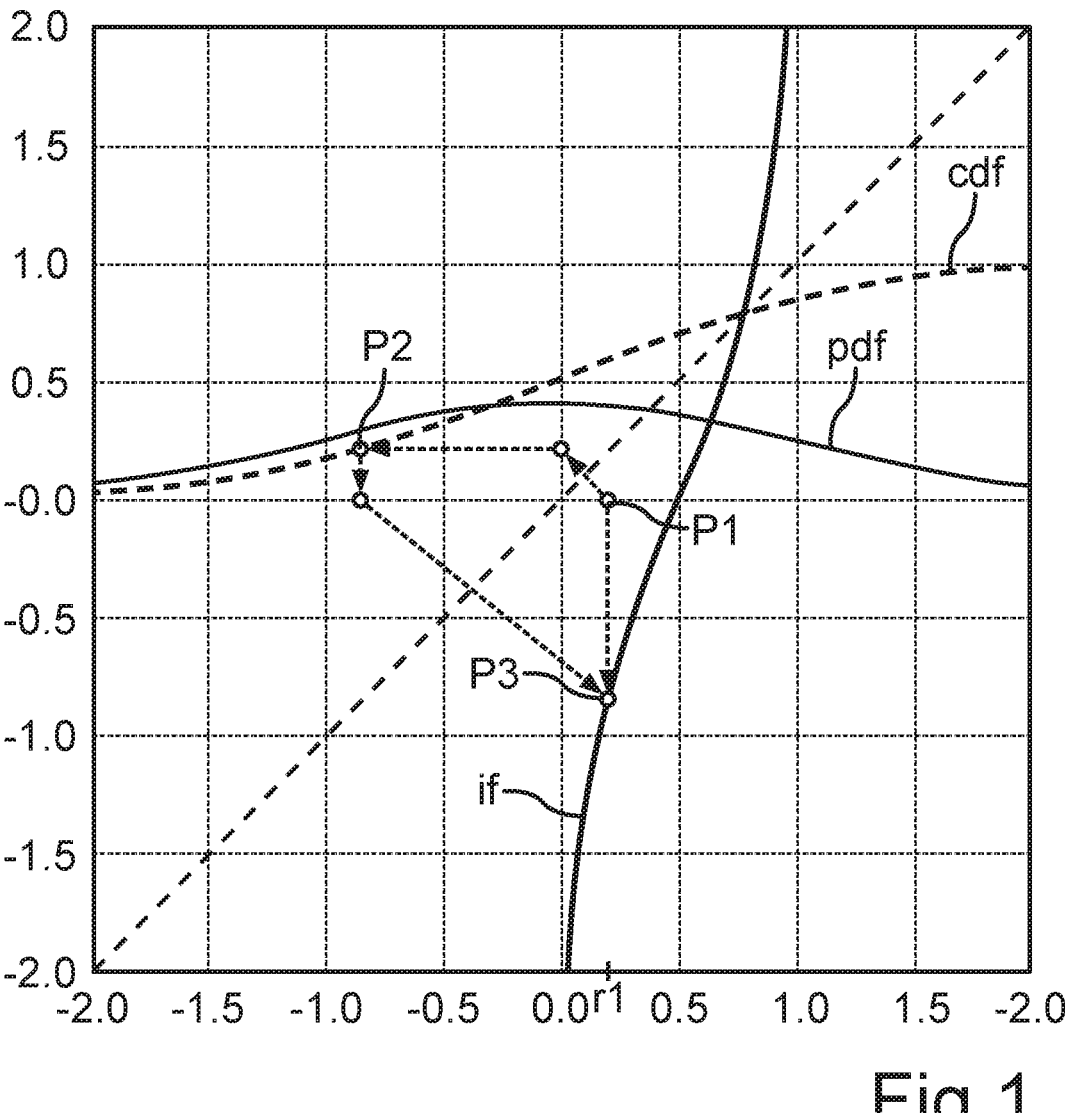

| | | | | |
|---|---|---|---|---|
| 2010/0201281 A1* | 8/2010 | Terashima | ............. | H05B 41/38 |
| | | | | 315/246 |
| 2011/0234096 A1* | 9/2011 | Asmussen | ............ | H05B 41/042 |
| | | | | 315/53 |

* cited by examiner

METHOD FOR OPERATING A DISCHARGE LAMP AND DISCHARGE LAMP

CROSS-REFERENCE TO RELATED APPLICATION

This application claims priority to German Patent Application No. 10 2021 209 574.7, filed on Aug. 31, 2021. The aforementioned application is hereby incorporated by reference in its entirety.

DESCRIPTION

The invention relates to a method for operating a discharge lamp by modulating a current signal for the discharge lamp, which is operated with at least two different frequencies. Furthermore, this invention relates to a discharge lamp that comprises an arc tube with a pair of electrodes.

In the market, there is a rising demand for an increased quality standard, for example an increased lifetime of the illuminants. Additionally, the illuminants should not suffer from visible artifacts like flicker. Many types of discharge lamps are operated with an alternating current signal (AC), i.e. the direction of the current or its polarity, respectively, changes in a periodic way. Due to the alternating current, the electrodes, especially the electrode tips, of the discharge lamp are subjected to certain, fast temperature changes. By applying an alternating current with one single defined frequency, an irregular abrasion of the electrodes may appear. Therefore, discharge lamps are often operated by applying two different frequencies with respect to the alternating current.

U.S. Pat. No. 7,023,144 B2 relates to a device for operating a high-pressure discharge lamp. This discharge lamp is filled with mercury with a concentration≥0.2 mg/mm³. The electronic control gear supplies an alternating current with a steady-state operating frequency from 60 Hz to 1000 Hz and a low frequency from 5 Hz to 50 Hz. The electronic control gear inserts the alternating current with a low frequency into the alternating current with the steady-state operating frequency with a time interval which has a length equal to at least one half-period and at most five periods of the low frequency.

Even if such modulation of frequency may be helpful in order to improve the quality or lifetime of discharge lamps, there is still space for further improvement.

One task of this invention may be to create a discharge lamp that offers a better quality with respect to the visible appearance if used in a projection system and/or an increased lifetime.

A current signal of a discharge lamp typically uses two different frequencies for the alternating current. The frequencies may also relate to the lamp voltage. This means that a modulation of frequencies can relate both to the current signal and the voltage signal. These different frequencies may each alternately applied for a stationary number of periods. The number of periods may still change depending on lamp operating conditions or parameters, like for example the lamp voltage and lamp power level.

The current invention is based on the knowledge that the current signal can be modulated or adapted by a number of periods, wherein each period may relate to a different frequency. For practical reasons the number of different frequencies is limited, in most cases two and up to five different frequencies are used.

A first aspect of this invention relates to a method for operating a lighting apparatus with a discharge lamp and a control unit that can solve the task. According to the invention, the method operates a discharge lamp by modulation of a current signal through the discharge lamp with at least two different frequencies by performing the following steps. The discharge lamp is preferably operated with at least two different frequencies. Nevertheless, due to the well-known physical relationships between current and voltage, the same holds true for a description based on the lamp voltage instead. The current signal may be regarded as a current flow, in particular as a current flow of charge carriers. The term "to modulate" may have the meaning of "to adapt" or "to adjust".

In a first step, a probability distribution function is defined and/or provided for a first number of first frequency periods and a second number of second frequency periods. The two different frequencies are referred to as first frequency and second frequency. Each of these two frequencies has a corresponding number of periods that are called first number of first frequency periods and second number of second frequency periods. The expressions "first" and "second" preferably do not contain any specific technical content. These two different expressions, "first" and "second", are preferably only to be considered as names allowing to distinguish between the different frequencies. It may be possible that more than two different frequencies, for example three, four, five or more frequencies, are used for the operation of the discharge lamp. In this case, a third frequency, a fourth frequency, and a fifth frequency with the corresponding third number, fourth number, or fifth number of frequency periods may appear. In particular, this means that for each frequency, a certain number of periods is addressed. The corresponding number of periods correlates to the appropriate frequency. The first number corresponds to the first frequency periods, and so on.

It is preferably stated that a number of periods may be understood as an integer number of periods, but also certain fractional number of periods can be used. A single period usually would contain at least two commutations where the polarity of the current is changed, like in a square wave or sine wave. Therefore, fractional periods may only be used to an extent which guarantees that the resulting long-term average current carries only a neglectable amount of DC current, i.e. both polarities are present in a comparable amount of time. This means that the first and/or second of the corresponding frequency periods may be a rational number or a natural (integer) number.

In a next step, the first number of first frequency periods and the second number of second frequency periods are determined depending on the probability distribution function by at least one random number. The random number may be generated by a random number generator. The random number can assure some randomness concerning the determination of the first number of first frequency periods and the second number of second frequency periods. The probability distribution function may be a deterministic function, but in cooperation with the at least one random number, a first number and/or second number of first frequency periods and second frequency periods can be generated. This can assure some degree of randomness for determining, the determination or generating of a modulated current signal. Determining can have the meaning of "the determination". The determination of the first or second number of frequency periods may also be considered as a generating of first and/or second numbers. The first and/or second numbers may be a plurality of numbers in form of a set or an array. The random number can by any figure. It is possible to create any random number from an arbitrary figure of the interval between 0 and 1 for example by appropriate scaling factors. Preferably the random number is an integer number.

It may also be possible that for each frequency, a separate random number is used to determine or generate a corresponding number of frequency periods. If two different frequencies are used for operating the discharge lamp, two different random numbers can be used to generate the first number and the second number of the first and second frequency periods. This step may also be repeated several times.

The current signal can be modulated by applying the first number of first frequency periods and the second number of second frequency periods to the current signal for operating the discharge lamp. In the steps before applying or modulating the current signal, the number of periods for the first and second frequencies may be determined by the at least one random number in combination with the probability distribution function. This contributes in particular to the first and second number of the first frequency and second frequency. These numbers of periods may be applied to the frequencies of the current signal. Each frequency may relate to a periodically repeated section of the current signal. For example, if the first frequency is represented by an alternating square-wave current with a frequency of 60 Hz, sixty repetitions occur in one second. One period of the current signal may include several maxima and minima, i.e. other current-shapes may be used as a smallest unit. In general, the current signal may be assembled by several current signals that have different frequencies. This feature can assigned to all embodiments.

The current signal can consist of the at least two different frequency periods or comprise the at least two different frequency periods. Preferably the current signal is a sequence of different frequencies arranged together directly. In other words, different current signals with different frequencies can be put together to create the modulated current signal.

The current signal may be a superposition of several frequency signals. The modulation of the current signal can be considered as a superposition of several different frequencies. The number of periods relates in particular to the several different frequencies. The current signal may be assembled by the at least two different frequencies, wherein each frequency is applied to the current signal according to the first and second number of first and second frequency period. This means that the current signal may be generated by different frequencies and the duration or length of each frequency depends on the first number of first frequency periods or on the second number of second frequency periods. In this way, a current signal may be created that is very random and therefore can avoid unbiased operation.

The current signal may be created by putting two different frequencies together, wherein the lengths of these frequencies are depending on the first and second number of the corresponding frequency periods. For example, if the first frequency is 60 Hz and the second frequency is 500 Hz, the first number of first frequency periods may be 100 and the second number for the second frequency periods may be 5000, the resulting current signal comprises an array or sequence of 100 periods of the first frequency (60 Hz) directly followed by 5000 periods of the second frequency (500 Hz). Preferably, these exact values can be applied in a first step or run for operating the discharge lamp. In a further step or run, another set of random numbers can be generated and applied to create another different modulated current signal. In particular, this results in a dynamic change of the modulation of the current signal.

The number of frequency periods may be determined in a recurring manner. This means that the process of determining the first number of first frequency periods and the second number of second frequency periods may be conducted several times. For example, it may be possible that an array or a set of first numbers of first frequency may be determined depending on the first frequency. This allows to determine a set of first/second numbers of first/second frequency periods. Each set can comprise several numbers.

This invention can describe an intentionally variable waveform sequence with randomly evaluated numbers of corresponding periods. The corresponding number of periods, the first number of first frequency periods and the second number of second frequency periods, can be derived from the probability distribution function.

In an advantageous additional or alternative embodiment, the probability distribution function defines a predetermined average ratio with regard to the first number of first frequency periods and the second number of second frequency periods. The average ratio may depend on a lamp parameter, for example the lamp voltage. The average ratio also may be a constant predefined value, which in particular may depend on the lamp voltage.

In particular, for each frequency, a separate probability distribution function is used. It may be advantageous that, as a boundary condition, a predetermined average ratio between the first number and the second number of the according frequency periods matches a predefined value. Furthermore, it is possible that the probability distribution function and/or predetermined average ratio between the first number and the second number of the according frequency periods is depending on discharge lamp parameters, such as the lamp voltage. The frequencies for the current signal, the allowed range of first and second number of first and second frequency periods, their average ratio and/or the chosen probability distribution functions may, for example—but not exclusively, depend on the discharge lamp voltage and the power level. Overall, this may result in a gentle operation of the discharge lamp. Its lifetime and its quality may be increased.

A type of filling gas, distance of the electrodes to each other, a property or status of the electrode tips, a behavior of the lamp voltage with respect to the polarity, a long-term development of the lamp voltage and/or operating hours of the discharge lamp can be lamp parameters. The lamp voltage may be the lamp parameter applied most. Nevertheless all explanations and embodiments described in context with the lamp voltage can be extended or transferred to any other lamp parameter mentioned in this application. These mentioned lamp parameters can be part of any embodiment and example. Several lamp parameters can be considered.

A current signal for the lamp current waveform can use at least two different operating frequencies which are applied in a defined sequence. The number of periods or half-periods for each frequency that is applied to the current signal is not fixed. These numbers, the first and second number of first and second frequency periods, can be determined by random numbers or the at least one random number. It is possible to regard the random number as a "pseudo-random number". These random numbers can arise from a pair or set of probability distribution functions. The probability distribution function and the first number of first frequency periods and the second number of second frequency periods may be depending on dynamically changing operating parameters of the discharge lamp. Alternatively or additionally, modified sets of probability distribution functions may be used for determining the first and second number of first and second frequency periods.

In an advantageous additional or alternative embodiment, the process of determining the first number of first frequency periods and the second number of second frequency periods as well as the modulation of the current signal depending on the first and second number of first and second frequency periods are performed repeatedly in order to obtain a randomized current signal during discharge lamp operation. Step b) and c) can be performed repeatedly. In this embodiment, several first numbers and several second numbers are determined. This means that an array or a set of first numbers as well as an array or a set of second numbers can be determined or generated. This array of first and second numbers can be used to create a current signal that is very random. This current signal can be modified continuously. Additionally, a different probability distribution function can be applied for each new conducted step. The recurring execution of the appropriate steps can depend on the discharge lamp, the frequencies, and/or other lamp parameters. Therefore, an individual current signal can be created for each discharge lamp. The current signal may be individualized in this embodiment.

In an alternative or additional embodiment at step b) a set of several first numbers of first frequency periods and several second numbers of second frequency periods are determined depending on the probability distribution function by the at least one random number. A group or array with several random numbers can be determined in advance. In different operation modes or runs different random numbers can be applied to determine the first or second numbers of the corresponding frequency periods.

In an alternative or additional embodiment, different probability distribution functions are defined for determining the first and second number for the first and second frequency periods. Alternatively, the sets of several first and second numbers for the first and second frequency periods may be determined. This means in particular for each frequency, a separate probability distribution function may be used in order to determine the first or second number of frequency periods. A first probability distribution function may be used to create the first number or a set of first numbers for the first frequency periods. This may analogously be applied to the second number and second frequency. In particular, the first and/or second probability distribution function may be flexible by applying a time-dependent parameter in the corresponding probability distribution function. This may result in a more unique and individual current signal for the discharge lamp.

In an advantageous alternative or additional embodiment, the probability distribution function may be defined as a probability density function with a corresponding cumulated density function and the first and second numbers for the first and second frequency periods are determined by applying the at least one random number to a corresponding inverse function of the cumulated density function. This method may be called an inversion method for creating random numbers that are used to determine the first and second numbers for the first and second frequency periods. The corresponding cumulated density function is in particular a non-decreasing function. The cumulated density function may be a monotonously rising function. The random number may be created by choosing a value between 0 and 1 and finding its corresponding value of the cumulated density function. In a mathematical manner, the at least one random number or another random value may be transformed into the first and second numbers for the first and second frequency periods by applying the random number or random value to the corresponding inverse function of the cumulated density function.

In an alternative or additional embodiment, the probability distribution function is defined as a uniform distribution, a normal distribution, an exponential distribution and/or an overlay of normal distributions. In this embodiment, random numbers may be created according to a pre-given distribution. An example for the exponential distribution may be expressed by following equation.

$$p(t)=r*\exp(-r*t);$$

wherein p(t) is the distribution function, t is a variable for the time and r represents a real number.

The pre-given distribution can include and/or consider discharge lamp parameters, such as the lamp voltage or lamp power level. Depending on a threshold value for the lamp voltage a certain distribution function of several pre-given functions may be selected. The probability distribution function can be depending on the lamp voltage. The pre-given distribution may be depending on the type of discharge lamp. This means that the probability distribution function may be adapted in accordance with the discharge lamp type and/or discharge lamp parameters, such as the lamp voltage. This may result in an individual current signal or current signals for the discharge lamp. An increased lifetime or better quality of the discharge lamp is possible.

In an alternative or additional embodiment, the defining of the probability distribution function and/or the first number of first frequency periods is based on one or more (discharge) lamp parameters, in particular a lamp voltage, a power level, a position and/or orientation of the discharge lamp, a current flow through a discharge lamp and/or an abrasion degree of electrode tips of the discharge lamp. This embodiment may be extended to several probability distribution functions and several discharge lamps. In this embodiment, the probability distribution function is not only based on mathematics, but rather on physical parameters, such as the lamp voltage, a power level, a position and orientation of the discharge lamp, a current flow through a discharge lamp and/or an abrasion degree of the electrode tips of the discharge lamp. Usually, each discharge lamp comprises a pair of electrodes that allow a current flow from one electrode tip to the other electrode tip. This current flow may appear as an arc. In this embodiment, physical parameters of the discharge lamp and/or physical parameters of the environment of the discharge lamp may be considered by the modulation of the current signal and their implementation for the discharge lamp operation.

Another advantageous additional or alternative embodiment offers the opportunity to define and/or provide a separate probability distribution function for each frequency and/or for each lamp parameter. In this embodiment, the current signal can be modulated individually according to demands of the discharge lamp or other preset requirements. This embodiment can be transfer to different types or groups of discharge lamps or lighting apparatuses. Different discharge lamps may result from different filling gases, different ranges of working voltages and/or different installation locations.

In another advantageous additional or alternative embodiment, the probability distribution function is defined depending on a threshold value of the discharge lamp voltage. The discharge lamp voltage is a common operating parameter for the discharge lamp. A modulation of the current signal may be useful if the discharge lamp voltage changes. For example, an operation of the discharge lamp at increased voltage may be related to a stronger abrasion of the electrode tips than at lower voltage. This can be considered by an appropriate probability distribution function. This means in particular that the probability distribution function follows a corresponding predetermined distribution. This predetermined distribution may consider the different physical effects that may appear upon operation of the discharge lamp in differing voltage ranges. The lifetime and quality of the discharge lamp can be improved or increased.

In another advantageous additional or alternative embodiment, the probability distribution function is defined by a characteristic diagram of the discharge lamp voltage. In this embodiment, the distribution function is not only depending on one single voltage value, but on a characteristic diagram or characteristic function depending on the discharge lamp voltage. The characteristic diagram may be a table, look-up table and/or characteristic curve for the discharge lamp voltage of the light apparatus. This means that an overall behavior of the discharge lamp over all possible lamp voltages can be considered by the probability distribution function. The mentioned features and advantages concerning any embodiments described herein are analogously valid for this embodiment.

A comparison between the lamp voltage and the threshold value for the voltage may indicate or trigger another probability distribution function. In this context, several different threshold values for the lamp voltage may be applied. Another possibility for considering threshold values for the lamp voltage is to compare and/or analyze a measured voltage curve to a characteristic diagram of the lamp voltage for the discharge lamp. The characteristic diagram may describe a spreading or variation of the lamp voltage during a pregiven interval of time. For example, the characteristic diagram may describe a drift of the lamp voltage in the long-term and/or during the pregiven interval of time. In another example, the characteristic diagram relates to temporal change of the lamp voltage in the long-term or during the interval of time. The change of the lamp voltage may be expressed by first derivation of a lamp voltage curve. A value for the lamp voltage can be compared to the threshold value and/or analyzed in combination with the characteristic diagram. The characteristic diagram can be a function that depends on the lamp voltage. In this case, the characteristic diagram can be regarded as "characteristic function".

In another advantageous additional or alternative embodiment, the first number of first frequency periods and the second number of second frequency periods are related by a pre-given ratio or a pre-given ratio interval. According to this embodiment, boundary conditions concerning the first and second numbers of the frequency periods may be set which will limit the valid ranges of the one or more distribution functions. For example a maximum and minimum value can be defined for the first and second numbers of the frequency periods. Therefore, the determining of the first and second numbers may not be entirely arbitrary in this embodiment. The distribution functions may be defined in a way that the resulting first and second numbers of the first and second frequency periods will match a pre-given ratio interval or a pre-given ratio. This can avoid that electrode tips are damaged by too long operation of certain frequencies due to unreasonably big numbers of first or second frequency periods.

In another additional or alternative embodiment, for each number or set of numbers concerning the first and/or second frequency periods, a separate random number is used. The current signal may comprise two different frequencies. For each frequency a different separate random number may be used to obtain the corresponding number of frequency periods.

The current signal may be a sequence of the at least two different frequencies. The sequence of the corresponding different frequencies is in particular determined by the first and second numbers of the first and second frequency periods. The first numbers of the first frequency periods may indicate the number of sequences of the first frequency. Preferably, the current signal is a sequence of the at least two different frequencies, wherein the frequencies alternately are arranged to the current signal. Each part of the sequence within the same frequency may be determined by the corresponding number of frequency periods. The corresponding number of frequency periods can indicate the duration of the period of the current signal. Therefore, the number of frequency periods may be considered also as type of a temporal length, in particular a sequence length. In this embodiment, it is possible that each sequence length that is the corresponding number of frequency periods is determined by a separate random number. Therefore, the degree of randomness may be enhanced by this embodiment.

In an advantageous additional or alternative embodiment, the probability distribution function addresses more than two different frequencies and for each frequency, a corresponding number of frequency periods is determined. According to this embodiment, three, four, or five frequencies are possible that form the current signal. This means the current signal may contain more than two different frequencies. Each of these frequencies may be allocated to a corresponding number of frequency periods. For each frequency different random numbers may be used to determine the number of frequency periods.

For example, a first frequency may be allocated to ten, a second frequency may be allocated to three, and a third frequency may be allocated to 13 frequency periods. In this case, the current signal may be a sequence of ten first frequency periods, three second frequency periods and 13 third frequency periods. A following sequence of the current signal may comprise completely different numbers of frequency periods. It is also possible that the succession of the frequencies itself may be different. For example, after the first frequency, the second frequency or the third frequency may appear in the current signal. Such a variation may be used if more than two different frequencies are used to create the current signal. The current signal may be created by a succession of different frequencies, wherein a duration or the sequence length of the frequencies is depending on the corresponding number of frequency periods.

Another additional or alternative advantageous embodiment envisages that the probability distribution function is defined by a lifetime and/or operating hours of the discharge lamp. The above-mentioned explanations and advantages are analogously valid for this embodiment.

A further advantageous additional or alternative embodiment envisages that after every frequency period, the current signal is commutated or at least the current signal is commutated after the corresponding first or second frequency periods. The commutation may be executed directly after an expiry of the corresponding frequency period.

A further additional or alternative advantageous embodiment envisages that the current signal is a square-wave signal, or a wave-shaped signal or a mixture of square-wave and wave-shaped signal. The current signal can consist of several segments with different, but temporarily constant current.

A further advantageous additional or alternative embodiment provides that the probability distribution function is defined by a superposition of several different functions.

The probability distribution function may be a mixture of several different functions that are superimposed. For example, a first function may be a linear function and a second function may be a uniform, normal and/or exponential function. A superposition of such two functions may be a linear increasing sinus wave signal. The superposition as well as each function of the superimposed distribution function may be depending on discharge lamp parameters like lamp voltage as well as on the lifetime of the discharge lamp. Each sub-function of the superimposed function may address a specific lamp state. By the superposition of several different functions that form the superposition, a new probability distribution function can be formed that may consider several and different parameters of the discharge lamp and/or environmental discharge lamp parameters. An increased lifetime of the discharge lamp and a better quality in the lightening of the discharge lamp may be a positive effect of this embodiment.

A further advantageous additional or alternative embodiment provides that the superposition of the several different probability functions is depending on a discharge lamp parameter, in particular the lamp voltage. Preferably, each probability function addresses another separate lamp parameter. Preferably, the lamp voltage is addressed at least by one probability function or by several probability functions or all probability functions. Each probability function may consider additional lamp parameters. Such additional lamp parameters may be a parameters describing the current wear of the electrode tips, a position and orientation of the discharge lamp, cumulated burning time of the discharge lamp and/or another individual discharge lamp parameter. This means a very flexible probability distribution function that is created by the superposition of several different functions can be provided. Therefore, the operation of the discharge lamp may be improved in terms of its lifetime and quality.

A second aspect of this invention addresses a lighting apparatus. The lighting apparatus can comprise a discharge lamp. The discharge lamp can comprise an arc tube with a pair of electrodes. The lighting apparatus can comprise a control unit. The current flow is established between this pair of electrodes leading to a discharge or plasma, also called "arc", in between. The arc is enclosed in a housing, the arc tube of the discharge lamp. Furthermore, the discharge lamp comprises a control unit. This control unit is capable and configured to conduct any of the methods described or explained within this application. The lighting apparatus can comprise a ballast unit. The ballast unit may provide the current signal to the discharge lamp. The ballast unit may include the control unit.

The control unit can define at least one probability distribution function for a first number of first frequency periods and a second number of second frequency periods. It can determine the first number of first frequency periods and the second number of second frequency periods depending on the probability distribution function by the at least one random number. The control unit can modulate the current signal by applying the first number of first frequency periods and the second number of second frequency periods to the current signal for operating the discharge lamp.

The features, examples and advantages presented in connection with the method according to the first aspect of the invention apply mutatis mutandis to the discharge lamp according to the second aspect of the invention, and vice versa. This means that features of the method can be considered to be features of the lighting apparatus and/or discharge lamp. Inversely, features of the lighting apparatus may be considered to be features of the method for operating the lighting apparatus.

The control unit may comprise one or more microprocessors and/or one or more microcontrollers. Further, the control unit may comprise program code that is designed to perform any method or any embodiment mentioned in this application when executed by the control unit. The program code may be stored in a data storage of the control unit.

The control unit can comprise a processor adapted to perform the method of any embodiment or example mentioned in this application. The control unit can be realized by a computer program product or a discharge lamp with the control unit comprising instructions which, when the program is executed by the computer or the control unit, cause the control unit or computer to carry out any steps of all embodiments or methods mentioned within this application. The computer program product can comprise instructions which, when the program is executed by the control unit or the computer, cause the control unit to carry out or execute the steps of any embodiment mentioned in this application.

It is possible that the invention provides a computer program product. The computer program product can comprise instructions to cause the discharge lamp to execute the steps of any embodiments or methods mentioned in this application. Furthermore, a computer-readable medium having stored thereon the computer program product can be part of this invention.

In the following, the invention is exemplarily described by the following figures. In this context, it has to be stated that the figures and all explanations to them shall only disclose advantageous embodiments of the invention.

Preferably, the figures and their explanations shall not limit the scope of this invention. Every single feature of the embodiments and figure can be extracted and combined with the other embodiments.

Figure 2:
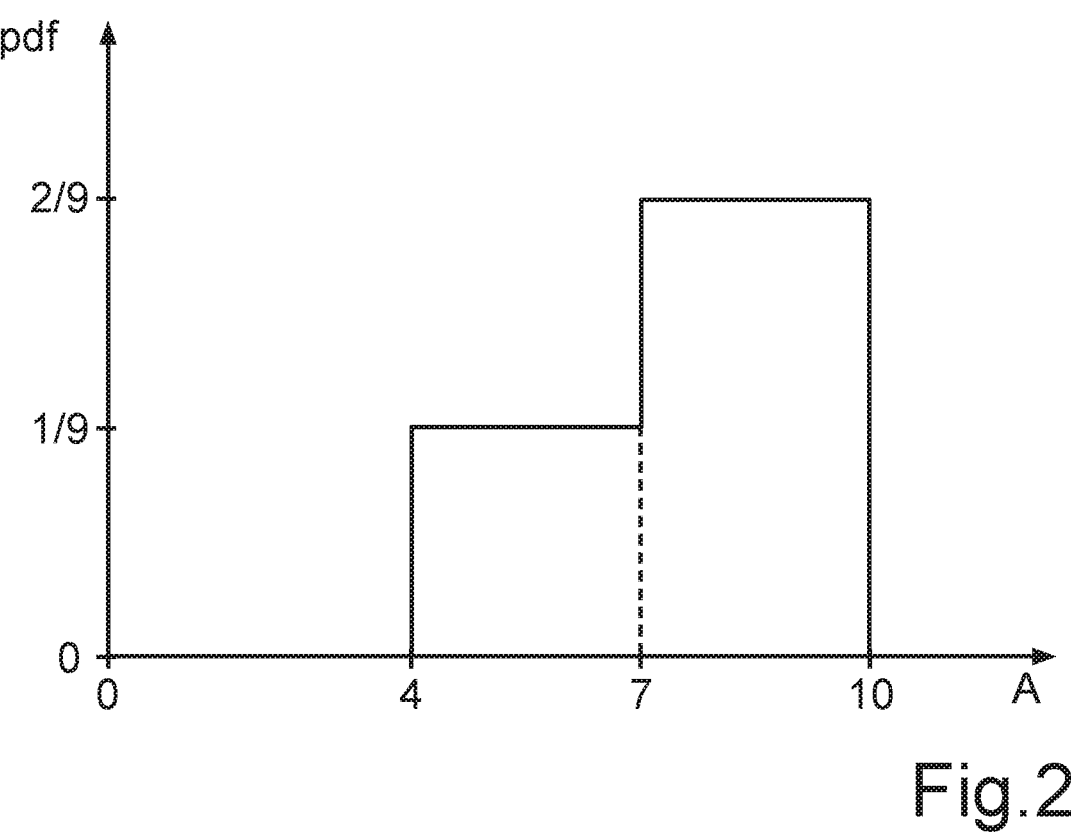
Figure 3:
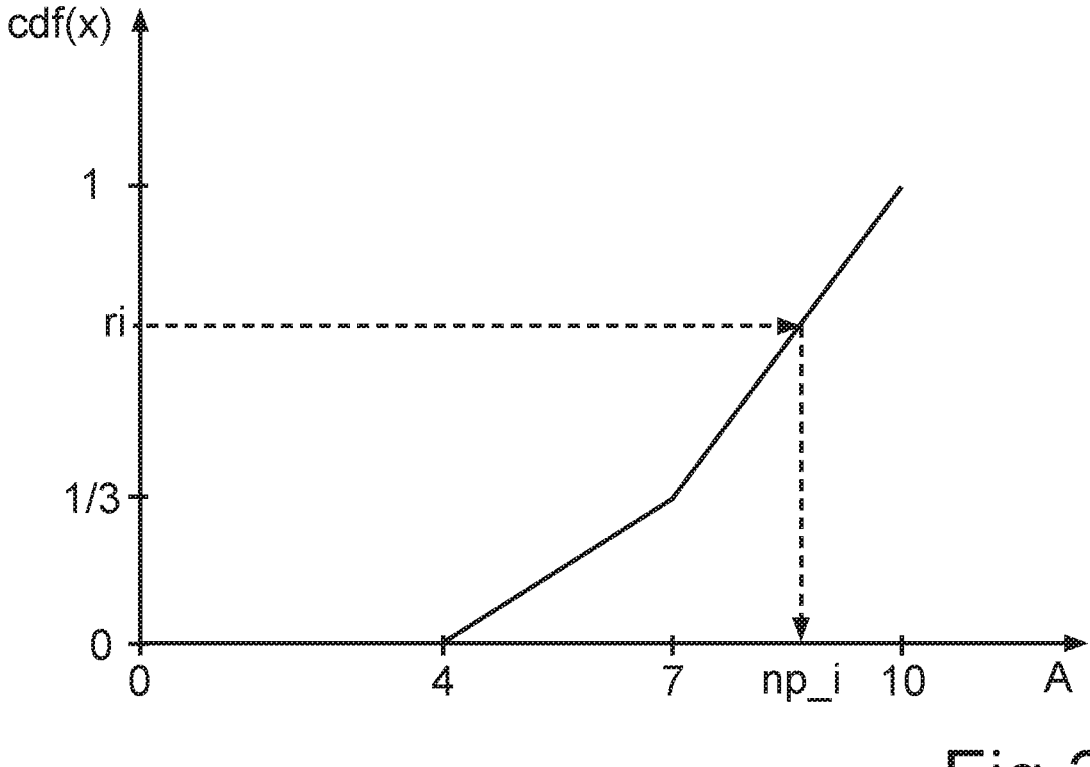
Figure 4:
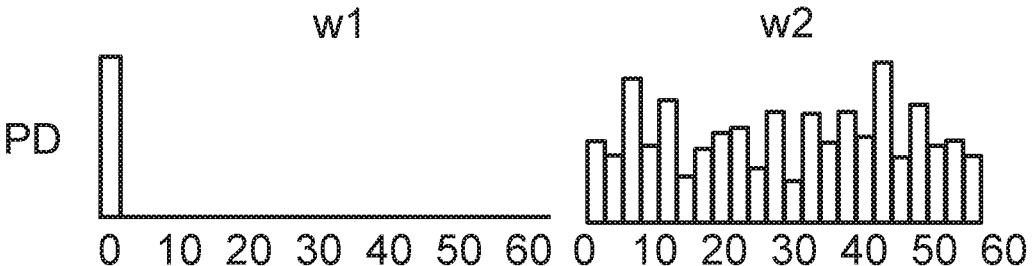
Figure 5:
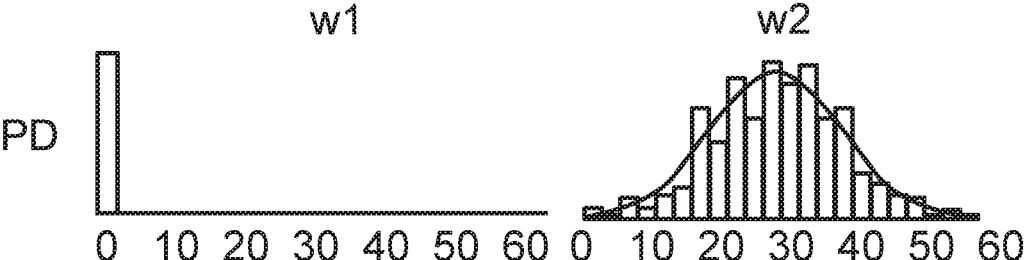
Figure 6:
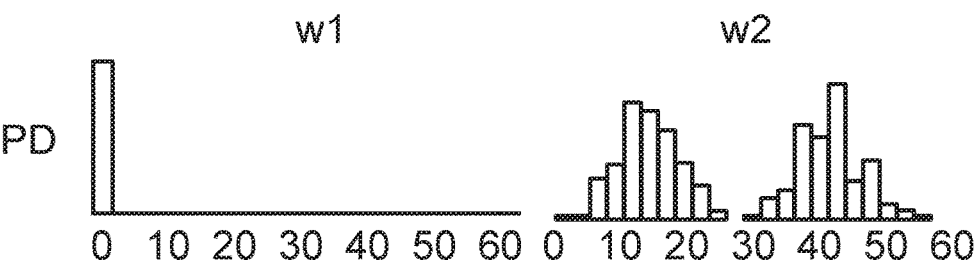
Figure 7:
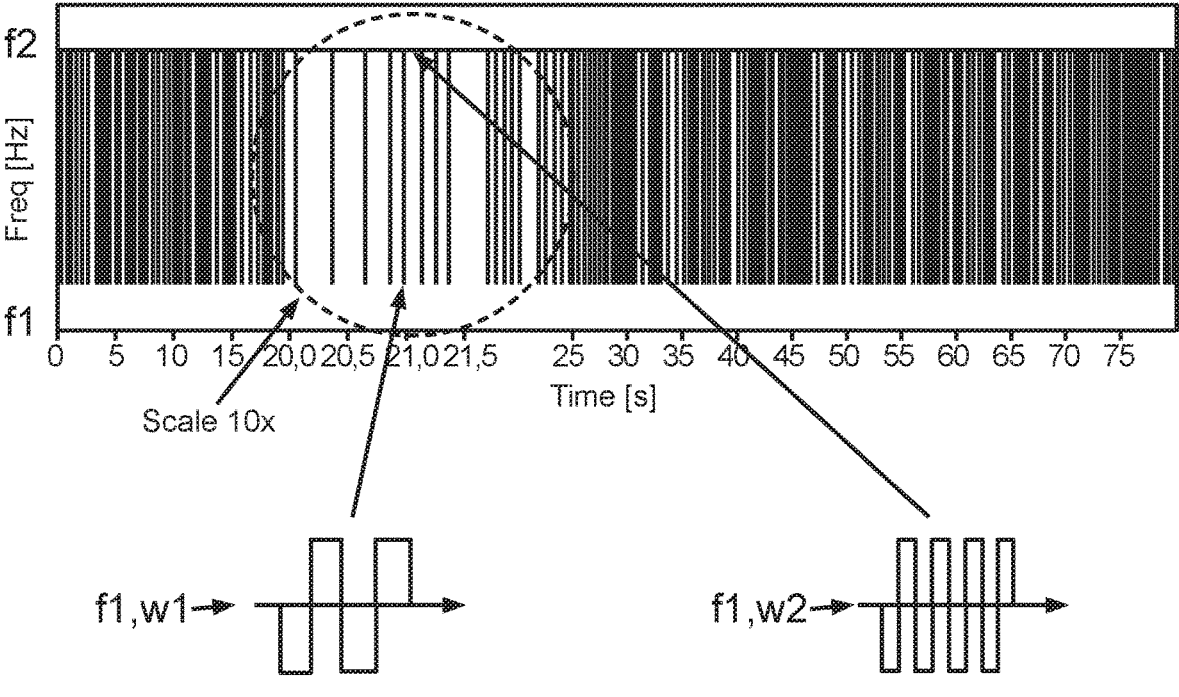
Figure 8:
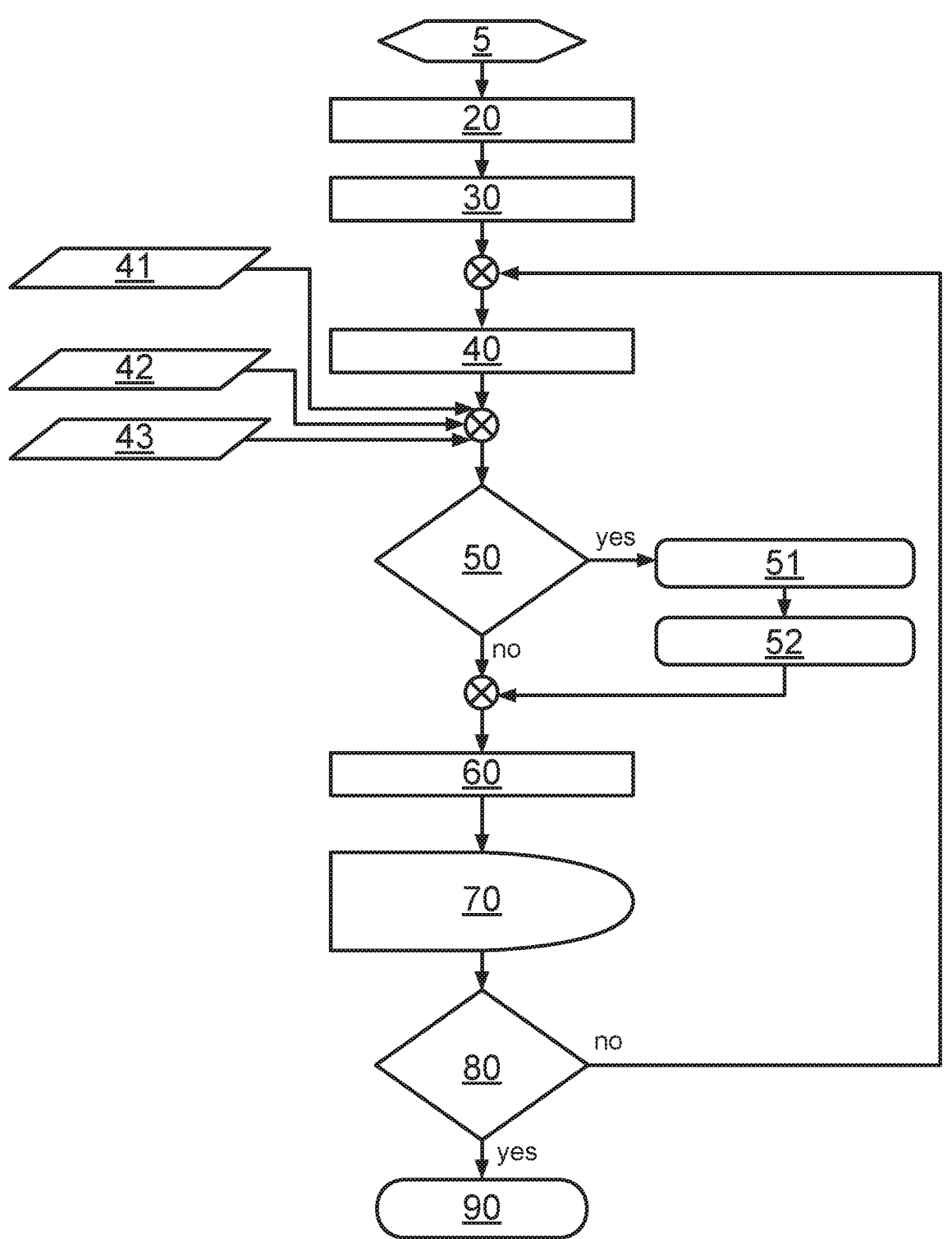
Figure 9:
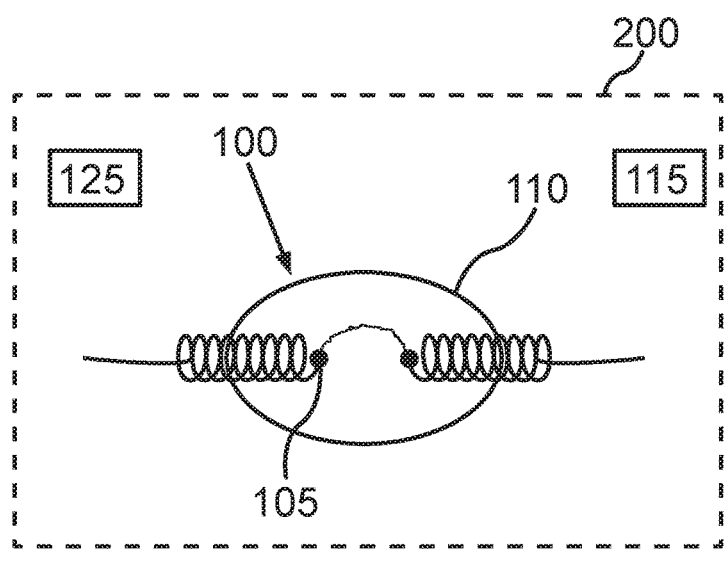
Figure 10:
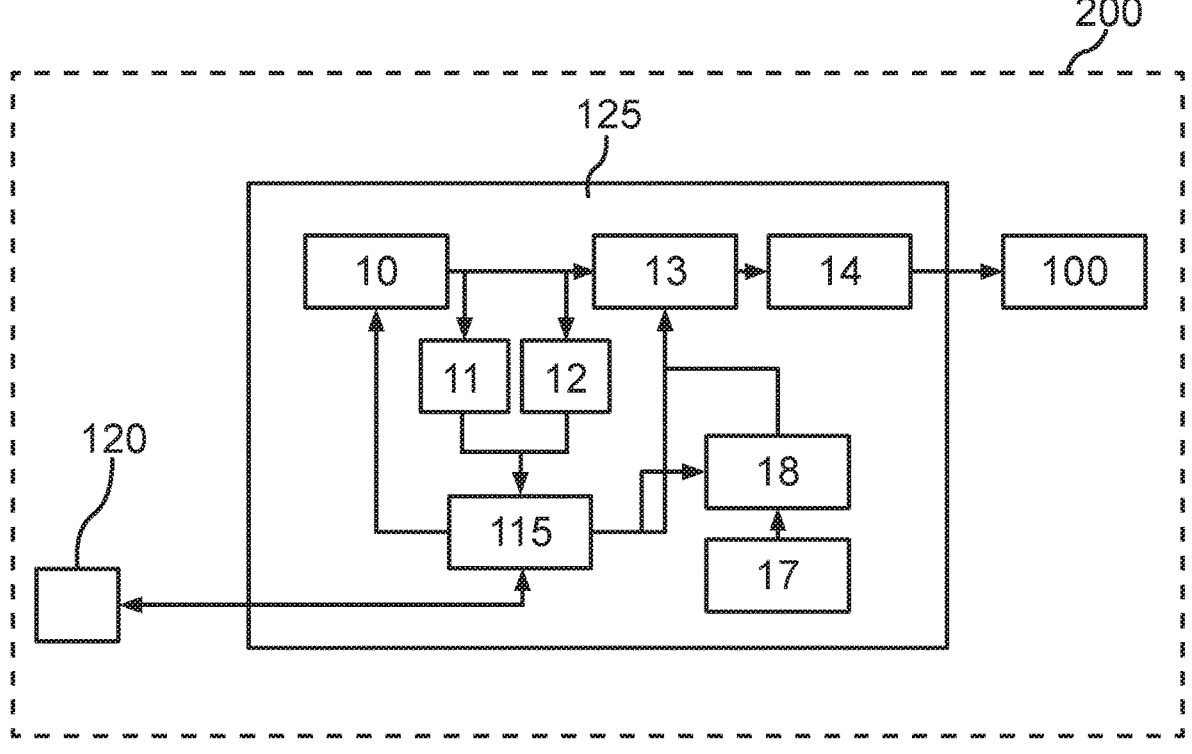

In this context, the figures show in:

FIG. 1 a diagram with a probability distribution function, a cumulated density function, and an inverse function;

FIG. 2 an exemplary probability density function;

FIG. 3 an exemplary cumulated density function;

FIG. 4 a period distribution and time distribution according to a first example;

FIG. 5 a period distribution and time distribution according to a second example;

FIG. 6 a period and time distribution for a third example;

FIG. 7 an exemplary alternating characteristic of a current signal that contains two different frequencies;

FIG. 8 an exemplary organigram that shows a possible operation of the discharge lamp;

FIG. 9 a schematic illustration of a lighting apparatus;

FIG. 10 a schematic operation scheme for the lighting apparatus.

In FIG. 9, a lighting apparatus 200 with a discharge lamp 100, a control unit 115 and ballast unit 125 as operation unit is shown. The discharge lamp 100 comprises an arc tube 110. Within the arc tube 110, a pair of electrode tips 105 is indicated. Between these two electrode tips 105, an arc discharge may appear. The discharge lamp 100 is able to emit light if a current flows between the electrode tips 105. Within the arc tube 110, a noble gas, such as helium, argon, crypton, etc., or a metallic gas, such as mercury or natrium, may be present. If the discharge lamp 100 is operated with an alternating current AC at a single frequency, the discharge lamp 100 may suffer from uneven wear and tear. An important aspect of this invention is to avoid such drawbacks. This can be achieved by operating the discharge lamp 100 with a current signal w that is rather random instead of deterministic.

FIG. 10 shows more components of the lighting apparatus 200 and an exemplary overview of the ballast unit 125 (operation unit) for the discharge lamp 100. The operation unit 125 comprises a DC/DC converter 10. The current flow A can be detected by a current detector 11 and a voltage detector 12. The lamp operation unit 125 comprises a polarity switch 13. The control unit 115 can switch the polarity by the polarity switch 13 or commutate the current signal w. The operation unit 125 can be part of the lighting apparatus 200. The DC/DC converter 10 is used to control the current flow according to a set value determined by the control unit 115. The set value can be determined based on measurements of the output voltage. Additionally, the control unit 115 can gather values for discharge lamp parameters 120. This means that the control unit 115 is able to measure and/or gather parameters concerning the current signal w for the discharge lamp 100. An ignition device 14 can be used to create a starting voltage for the discharge lamp 100 at the start of the lamp operation.

The lamp operation unit 125 may comprise a random number generator 17. The random number generator 17 may generate a set or stream of random numbers ri in a predetermined range. The predetermined range can be between the values 0 and 1. An adaption of the random number generator 17 is not necessary because physical and/or statistical influences may be considered by a distribution shaping unit 18. In the distribution shaping unit 18, these random numbers ri can be used to calculate values for the first/second number of frequency periods np_i. The distribution shaping unit 18 and/or the control unit 115 may calculate several number of frequency periods np_i in form of a set or array.

FIG. 1 shows a probability distribution function pdf, a cumulated density function cdf, and an inverse function if. In probability theory and statistics, a probability distribution is a mathematical function that gives the probabilities of occurrence of different possible outcomes for an experiment. The probability distribution function pdf and its derived functions cdf and if are used to create and/or determine a first number np1 of first frequency f1 periods and/or a second number np2 of second frequency f2 periods. This is preferably achieved by the implementation or use of at least one random number ri.

Another example to evaluate values for the lamp voltage is presented by FIG. 1. A random number ri from the interval [0 . . . 1) is generated, for example by the random number generator 17 with an uniform probability distribution.

An inverse cumulated density function if can be determined according to the probability distribution function pdf or is pregiven. A number of (half-)periods np_i matching the random number can be evaluated. In FIG. 1 this would be a coordinate of point P3.

Another option is to determine the number of (half-)periods np_i based on the random number ri and the cumulated density function cdf. This would lead to the x-coordinate of point P2. The x-coordinate of P2 and/or the y-coordinate of P3 can be used as values for the lamp voltage. The cumulated density function cdf and its inverse function if relate to the probability density function pdf or can be derived from the probability density function pdf. Maximum and minimum values for the lamp voltage can be determined by one of these functions.

The following FIGS. 2 to 3 show exemplarily how the number of periods np_i may be determined and/or created. A generation of random numbers ri is often achieved by a method that is called the inversion method and can be performed by a random number generator 17. The inversion method can be applied, at least in principle, in all cases where an explicit expression for the cumulate density function cdf of the related variable exists. In this case, the variable would relate to the numbers of frequency periods np_i. This is in particular the first number np1 and second number np2. Instead of the first or second number, of course, a set of first numbers np1 or second numbers np2 may be applied or implemented to one of the mentioned methods. Preferably, the inversion method is applied for a non-decreasing inversion function if. This means that the cumulated density function cdf has to be preferably invertible. Depending on the cumulated density function cdf and/or the related inverse function if, the random number(s) ri may be created and/or determined.

In FIG. 1, the probability distribution function pdf is illustrated as a normal distribution. The cumulated density function cdf and the according inverse function if depend on the formula of the probability distribution function pdf. A higher probability of certain random numbers (larger values in the pdf) is related to a steeper rise of the cdf which is mathematically the integral function of the pdf. In the example of FIG. 1, the random number ri may be calculated starting from a random variable r1 which is in the interval between 0 and 1 and follows a uniform distribution where all numbers have the same probability of occurrence. In a next step of the inversion method, the inverse of the cumulated density function cdf is calculated.

In FIG. 2, an exemplary probability distribution function pdf is shown. In general the probability distribution function pdf can relate to a density distribution of probabilities. Therefore probability distribution function pdf can be regarded as "probability density function". The probability density function pdf is usually a function whose value at any given sample or point in the sample space can be interpreted as providing a relative likelihood that the value of the random variable would equal that sample. In other words, while the absolute likelihood for a continuous random variable to take on any particular value is zero, the value of the probability density function pdf at two different samples can be used to infer, in any particular draw of the random variable, how much more likely it is that the random variable would equal one sample compared to the other sample.

FIG. 2, for example, may show a luminance between a current of 0 and 10 ampere. The x-axis "A" in FIG. 2 relates to a current in ampere. For simplification between 4 and 7 ampere and between 7 and 10 ampere a constant level of luminance shall be present. Below 4 ampere the luminance is set to zero. It is dark in this case. Between 7 and 10 ampere surrounding objects are well visible to humans. In this interval objects are probably detected. Below 4 ampere the luminance is so low that no object is visible and can be detected. An event may be, for example, an object may be detected. The probability density function indicates how likely it is that a detection of the object appears at a certain level of current flow A. It can be seen that no object is detected until 4 ampere. Between the 4 and 7 ampere, the likelihood or probability for the object detection is 1:9, whereas the same likelihood between ampere seven and ten is 2:9.

In FIG. 3, a related cumulated density function cdf of FIG. 2 is presented. At the end, the cumulated density function cdf, ends up in the probability of 1, this is at current flow 10

A. This results due to the fact that if an object has been detected, there has to be a current flow relating to this detection. Since the likelihood is zero for the first four amperes, of course, the cumulated density function cdf is also zero in this interval. From four ampere to seven ampere, it rises according to the probability value 1:9 of the probability density function pdf. Between ampere seven and ampere ten, the cumulated density function cdf rises stronger since the likelihood or probability is twice as high as between kilometer four and seven. The y-axis of FIG. 3 shows the random number ri. The inverse value of the random number ri can lead to the first number np1 for the first frequency f1 periods. This method can be applied repeatedly and, of course, for the second number np2 of second frequency f2 periods. Therefore, the random number ri is indicated with an index i as well as the first and/or second numbers np_i. The FIGS. 1, 2 and 3 only show additional examples for a better understanding of this invention.

This is a possible method to generate and/or determine the first number np1 of first frequency f1 periods and/or the second number np2 of second frequency f2 periods. Of course, it is possible to apply another alternative method to obtain the first or second numbers np1 or np2. Other methods may be the relationship method, the rejection method, or the method of approximation. Generally, the generation of random numbers ri is well-known. The random number(s) ri may be generated by the random number generator 17.

FIGS. 4 to 6 show three different examples of a period distribution PD. The x-axis denotes the number of periods np_i, and the y-axis counts the occurrences of these respective numbers obtained through observing the system for a limited time. The graphs therefore represent only an approximation of the ideal, mathematical functions. Usually, the first numbers np1 of first frequency f1 periods are kept variable. But in case of the examples from FIGS. 4 to 6, the first number np1 has been fixed to the value 0.5 by restricting the respective distribution functions. This fractional number represents one single half-period of the first frequency f1 period. Only the second numbers np2 of second frequency f2 periods are kept variable. This means that the invention applies in this case only for frequency periods for the second frequency f2. The first current signal w1 is represented only by one single bar in FIGS. 4 to 6.

| Table with data relating to FIG. 4 | | | |
|---|---|---|---|
| Uniform Distribution | Distribution Periods | | |
| f [Hz] | % of Total | Min | Max |
| 30 | 1.8 | 0.5 | 0.5 |
| 180 | 98.2 | 1 | 54 |

| Table with data relating to FIG. 5 | | | |
|---|---|---|---|
| Normal Distribution | Distribution Periods | | |
| f [Hz] | % of Total | Min | Max |
| 30 | 1.8 | 0.5 | 0.5 |
| 180 | 98.2 | 1 | 53 |

| Table with data relating to FIG. 6 | | | |
|---|---|---|---|
| Overlaid Distribution | Distribution Periods | | |
| f [Hz] | % of Total | Min | Max |
| 30 | 1.9 | 0.5 | 0.5 |
| 180 | 98.1 | 3 | 51 |

In FIG. 4, the current signal w consists of two different signals, the first signal w1 and the second signal w2. The first signal w1 has the first frequency f1 that is 30 Hz. The second frequency f2 of the second signal w2 is 180 Hz. According to Table 1, the number of periods for the first frequency f1 is constant 0.5. In this case, this is a preset boundary condition. In FIGS. 4 to 6, the first number np1 of the first frequency f1 periods is constant 0.5. Concerning the second signal w2 with the second frequency f2 with 180 Hz, the according second number np2 of the second frequency f2 periods may vary between the values 1 and 54. In this case, a minimum or maximum value for the second number np2 is given as an additional boundary condition for the second numbers np2.

Moreover, the probability distribution function pdf that influences the derived second numbers np2 may be different. In FIG. 4, the probability distribution function pdf is a uniform distribution. This means that the values for the second numbers np2 may distribute accidentally and uniformly across the interval 1 to 54. This can be seen in the appropriate right diagrams of FIG. 4. The above right diagram shows the second numbers np2. It is visible that the corresponding diagram shows a distribution of bars between the values 1 and 54. Since the generation of the second numbers np2 is influenced by the random number, the values for the second numbers np2 are determined randomly. Therefore, no constant uniform distribution appears or is visible.

FIGS. 5 and 6 are different from FIG. 4 with respect to the probability distribution function pdf. In FIG. 5, the probability distribution function pdf is a normal distribution. A normal distribution is also known as a Gaussian curve. According to the Gaussian curve, accumulation of the second numbers np2 appears around a mean value. This mean value is about 0.15 according to FIG. 5 and is part of the probability distribution function pdf. This means that the probability distribution function pdf, which is a normal distribution in case of FIG. 5, directly influences the distribution of the second numbers np2.

In FIG. 6, the second numbers np2 may vary between the values 3 and 51. In case of FIG. 6, the probability distribution function pdf is an overlaid normal distribution. This results according to the right above diagram of FIG. 6 in two separate curves.

As can be seen from the tables, based on the predefined allowed ranges, the average ratio of numbers np1, np2 for all three examples results in the same approximate average ratio of 2:98 on a long term. Even if the underlying distribution function are completely different. This may have differing effects on the lamp lifetime, lamp voltage drift etc.

Of course, it is possible to implement further parameters in the probability distribution function. For example, the probability distribution function can consider physical lamp parameters 120. Preferably, the lamp voltage may be considered via the probability distribution function pdf. The impact of the different probability distribution function pdf on the second numbers np2 may analogously appear when assigning the first numbers np1.

Overall, FIGS. 4 to 6 show three different examples of probability distributions which may be used for a creation of an alternating wave form sequence. The first current signal w1 is a defined current signal w1 with a first number np1 of first frequency f1 periods that is set to 0.5 constantly in FIGS. 4 to 6. The second numbers np2 may follow a uniform distribution, a normal distribution that can contain a mean and standard deviation and an overlay of normal distributions with a double peak.

In FIG. 7, an alternating characteristic of two current signals w1 and w2 is shown. The current signal w1 or w2 both apply a square wave with frequencies f1 and f2. A diagram that shows the time on the x-axis and the first and second frequencies f1 and f2 on the y-axis does not allow to distinguish between these two different frequencies on a large time scale. Inside the circle where the time scale is zoomed by the factor of ten, the short periods of the current signals w1 and longer periods of w2 would become visible. A certain randomness between periods of the current signal w1 and w2 also can be seen. The distances between the corresponding signals are irregular. The lamp current comprises the two different lamp current signals, which is the first signal w1 and the second signal w2. The lamp current which is actually applied at the discharge lamp is illustrated by the insets below as it takes place within an even smaller timeframe.

In FIG. 8, a simplified operation scheme for the lighting apparatus 200 is shown. The scheme illustrated in FIG. 8 is explained from the top to the bottom. After a general initialization 5 of the control unit, the discharge lamp 100 is ignited and pre-heated (20). Then some waveform operation initialization 30 may be performed.

A next step 40 may be the measurement of the lamp voltage U. In a next step, different parameters for operating the discharge lamp 100 are set. These parameters may be the waveform 41, the power level 42 and/or a run-up or power control condition 43. Additionally, other physical parameters of the discharge lamp 100 may be acquired and considered for the operation. In most cases, the lamp voltage U is a parameter that is considered during the operation of the discharge lamp 100 or lighting apparatus 200. In the next step, a check 50 is carried out in order to evaluate whether any operation parameters have changed. If no parameter change is detected, a determination 60 of the first numbers np1 and second numbers np2 for the first and second frequency f1, f2 periods is carried out.

The creation or determination of the first and second numbers np1 or np2 may be conducted in any method or way which has been described in this application. With the first and second numbers, the first current signal w1 and the second current signal w2 can be created that form the overall current signal for the operation of the discharge lamp 100. These two different current signals w1 and w2 contain the two different frequencies f1 and f2.

In a next step 70, a sequence pattern for the first signal w1 according to the first numbers np1 is applied. When the sequence pattern has ended or the requested number of periods has expired, that is the first number np1 of the first frequency f1 periods, the wave form of the current signal w changes. This happens on the basis of switching the first current signal w1 to the second current signal w2. The current signal w1 can be switched to the second signal w2 with the resulting second number np2 of second frequency f2 periods. If the second current signal w2 has passed the second number np2 periods, the current signal w is again switched to the first current signal w1. In this situation, another value for the first number np1 and second number np2 may be determined in step 60. The first current signal w1 has the first frequency f1 and the second signal w2 has the frequency f2. The new current signal w comprises a mixture of the first and second signal wherein the number np_i of periods of each signal may be different and may be determined by the at least one random number ri.

Therefore, all explained and mentioned methods may be applied. In the case, if at step 50 a change of parameters is detected, a sequence setup may be updated in step 51. This means that the number of applied different frequencies, the frequencies itself, and their sequence of application may change. In this case, preferably the probability distribution functions pdf or the allowed ranges of numbers of periods np_i are updated in step 52. During the operation of the discharge lamp 100, a check concerning a switch of signal 80 may be done. If a switch of signal 80 is detected, the discharge lamp 100 is switched off in a final step 90. If no switch of signal 80 is detected, the method is continued by again obtaining the lamp parameters 120 in steps 40 to 43. If there is no change in the operation parameters in block 50, the method continues straightforward to block 60, 70, 80, and then back to block 40.

This means that other sequences or other sets of probability distribution functions may be used if lamp operating parameters 120 change. All methods described herein allow an operation of the lighting apparatus 200 with a randomized current signal w. Visible light variation artifacts like flicker resulting from a regular low frequency wave form and/or fixed sequence length patterns may be suppressed. The so created randomized current signal w via probability distribution functions pdf introduces a degree of freedom for driving a discharge lamp when certain waveforms shall not be used due to application restrictions. Furthermore, a randomized current signal w will lead to a smoother temperature distribution on the electrode tips. In contrast, fixed sequence lengths may involve the risk of running the tips in a too cold or too hot state which may lead to too strong melting or erosion of the tips.

LIST OF REFERENCE SIGNS

10 general initialization
20 ignition
30 waveform operation initialization
A ampere, current flow
U discharge lamp voltage
41 setting waveform
42 setting power level
43 run-up power control condition
50 check of parameters
51 update sequence setup
52 update probability distribution functions
60 modulating current signal
70 operating discharge lamp
80 switch off signal
90 switching off
w current signal
w1 first current signal
w2 second current signal
f1 first frequency
f2 second frequency
np1 first number(s)
np2 second number(s)
np_i numbers
ri random number(s)
PD period distribution
cdf cumulated density function if inverse function
P1 first point
P2 second point
P3 third point
The invention claimed is:

1. A method for operating a discharge lamp by modulating a current signal for the discharge lamp which is operated with at least two different frequencies, each of which is addressed for a certain number of periods, by performing the following steps:

a) defining and/or providing a probability distribution function for a first number of first frequency periods and a second number of second frequency periods, b) determining the first number of first frequency periods and the second number of second frequency periods depending on the probability distribution function by at least one random number, and c) modulating the current signal by applying the first number of first frequency periods and the second number of second frequency periods to the current signal for operating the discharge lamp;

wherein a frequency period contains at least two commutations where the polarity of the current signal is changed, and the probability distribution function is defined as a probability density function with a corresponding cumulated density function and the first and second numbers for the first and second frequency periods are determined by applying the at least one random number to a corresponding inverse function of the cumulated density function.

2. The method according to claim 1, wherein step b) and step c) are performed repeatedly in order to obtain a randomized current signal during discharge lamp operation.

3. The method according to claim 1, wherein at step b) a set of several first numbers of first frequency periods and several second numbers of second frequency periods are determined depending on the probability distribution function by the at least one random number.

4. The method according to claim 1, wherein different probability distribution functions are defined for determining the first and second number for the first and second frequency periods or for determining the sets of several first and second numbers for the first and second frequency periods.

5. The method according to claim 1, wherein the probability distribution function is defined as a uniform distribution, an exponential distribution, a normal distribution and/or an overlay of distributions.

6. The method according to claim 1, wherein the defining the probability distribution function is based on one or more discharge lamp parameters, in particular a lamp voltage, the first and second frequency of the first and second current signal, a power level, a position and orientation of the discharge lamp, a current flow through the discharge lamp and/or an abrasion degree of electrode tips of the discharge lamp.

7. The method according to claim 6, wherein for each frequency, for each discharge lamp parameter, each type or group of discharge lamp a separate probability distribution function is defined and/or provided.

8. The method according to claim 6, wherein the probability distribution function is further defined depending on a threshold value of the discharge lamp voltage.

9. The method according to claim 6, wherein the probability distribution function is defined by a characteristic diagram of the discharge lamp voltage.

10. The method according to claim 1, wherein the first number of first frequency periods and the second number of second frequency periods are related by a pregiven ratio or a pregiven ratio interval.

11. The method according to claim 1, wherein for each number or set of numbers concerning the first and/or second frequency periods a separate random number is used.

12. The method according to claim 1, wherein the probability distribution function addresses more than two different frequencies and for each frequency a corresponding number of frequency periods is determined.

13. The method according to claim 1, wherein the probability distribution function define a predetermined average ratio with regard to the first number of first frequency periods and the second number of second frequency periods, wherein in particularly the predetermined average ratio depends on a lamp parameter and/or is a constant predefined value.

14. The method according to claim 1, wherein the probability distribution function is defined based on a lifetime of the discharge lamp.

15. The method according to claim 1, wherein the first and/or second current signal is a square-wave signal, a wave-shaped signal or a mixture of wave-shaped and square-waved signal.

16. The method according to claim 1, wherein the probability distribution function is defined by a superposition of several different functions.

17. A lighting apparatus comprising a discharge lamp which is operated with at least two different frequencies, each of which is addressed for a certain number of periods, wherein the discharge lamp comprises an arc tube with a pair of electrodes, a ballast unit for providing a current signal for the discharge lamp, and a control unit that is configured to define at least one probability distribution function for a first number of first frequency periods and a second number of second frequency periods, determining the first number of first frequency periods and the second number of second frequency periods depending on the probability distribution function by at least one random number, and modulate the current signal by applying the first number of first frequency periods and the second number of second frequency periods to the current signal for operating the discharge lamp;

wherein a frequency period contains at least two commutations where the polarity of the current signal is changed, and the probability distribution function is defined as a probability density function with a corresponding cumulated density function and the first and second numbers for the first and second frequency periods are determined by applying the at least one random number to a corresponding inverse function of the cumulated density function.

* * * * *